(12) United States Patent
Jeong et al.

(10) Patent No.: US 10,492,173 B2
(45) Date of Patent: Nov. 26, 2019

(54) ELECTRONIC DEVICE AND METHOD FOR PERFORMING WIRELESS COMMUNICATION OF THE SAME

(71) Applicant: Samsung Electronics Co., Ltd., Gyeonggi-do (KR)

(72) Inventors: Taeyoung Jeong, Gyeongsangbuk-do (KR); Seungjae Lee, Daegu (KR); Jongmu Choi, Gyeonggi-do (KR); Sungjun Kim, Daegu (KR); Yeunwook Lim, Daegu (KR)

(73) Assignee: Samsung Electronics Co., Ltd. (KR)

( * ) Notice: Subject to any disclaimer, the term of this patent is extended or adjusted under 35 U.S.C. 154(b) by 169 days.

(21) Appl. No.: 15/171,584

(22) Filed: Jun. 2, 2016

(65) Prior Publication Data

US 2017/0094640 A1    Mar. 30, 2017

(30) Foreign Application Priority Data

Sep. 30, 2015   (KR) .................. 10-2015-0137580

(51) Int. Cl.
*H04W 72/02*   (2009.01)
*H04W 72/04*   (2009.01)
(Continued)

(52) U.S. Cl.
CPC .......... *H04W 72/02* (2013.01); *H04W 36/06* (2013.01); *H04W 72/0453* (2013.01);
(Continued)

(58) Field of Classification Search
CPC ............. H04W 72/02; H04W 72/0453; H04W 72/0486; H04W 84/12; H04W 24/08;
(Continued)

(56) References Cited

U.S. PATENT DOCUMENTS 8,175,539 B2 *  5/2012  Diener ................ H04L 1/0001
                                                370/318
8,199,705 B2 *  6/2012  Karaoguz ............ G01S 5/0252
                                                370/329
(Continued)

FOREIGN PATENT DOCUMENTS

JP       2004-179693      6/2004
KR       10-1436593       8/2014
WO    WO 2007/015962     2/2007

OTHER PUBLICATIONS

Derek Ferro, and Bill Rink, "Understanding Technology Options for Deploying WIFI", 2014, Ubee Interactive, Technical Paper prepared for the Society of Cable Telecommunications Engineers, pp. 1-43 (Year: 2014).*

(Continued)

*Primary Examiner* — Un C Cho
*Assistant Examiner* — Shah M Rahman
(74) *Attorney, Agent, or Firm* — The Farrell Law Firm, P.C.

(57) ABSTRACT

An electronic device and method are provided. The electronic device includes a communication module configured to support short-range wireless communication with an external device using a first band and a second band; a processor electrically connected to the communication module; and a memory electrically connected to the processor, wherein the memory, when executed, stores instructions to cause the processor to confirm at least one characteristic of a function and surrounding network environment information in response to a function performance request, and perform the function through one of the first band and the second band of the external device based on at least one of the characteristic of the function and the surrounding network environment information.

16 Claims, 11 Drawing Sheets

(51) Int. Cl.
*H04W 36/06* (2009.01)
*H04W 88/06* (2009.01)
*H04W 48/20* (2009.01)
*H04W 84/12* (2009.01)
*H04W 88/02* (2009.01)
*H04W 48/00* (2009.01)

(52) U.S. Cl.
CPC ........ *H04W 72/0486* (2013.01); *H04W 48/00* (2013.01); *H04W 48/20* (2013.01); *H04W 84/12* (2013.01); *H04W 88/02* (2013.01); *H04W 88/06* (2013.01)

(58) Field of Classification Search
CPC ..... H04W 36/06; H04W 48/00; H04W 48/16; H04W 48/20; H04W 4/028; H04W 52/0274; H04W 88/02; H04W 88/06; Y02B 60/50
USPC .......................................... 370/329
See application file for complete search history.

(56) References Cited

U.S. PATENT DOCUMENTS

| | | | | |
|---|---|---|---|---|
| 8,620,319 | B1* | 12/2013 | Thandu | H04W 48/02 |
| | | | | 370/331 |
| 8,670,763 | B1* | 3/2014 | Oroskar | H04W 36/0061 |
| | | | | 370/331 |
| 9,894,604 | B1* | 2/2018 | Tran | H04W 48/20 |
| 2002/0080739 | A1* | 6/2002 | Kuwahara | H04B 1/715 |
| | | | | 370/333 |
| 2008/0298450 | A1 | 12/2008 | Zhang et al. | |
| 2010/0220767 | A1* | 9/2010 | Berens | H04L 5/0007 |
| | | | | 375/135 |
| 2011/0065440 | A1 | 3/2011 | Kakani | |
| 2011/0158110 | A1 | 6/2011 | Stacey et al. | |
| 2011/0188376 | A1* | 8/2011 | Stupar | H04L 12/5692 |
| | | | | 370/235 |
| 2011/0269502 | A1 | 11/2011 | Clark et al. | |
| 2012/0108185 | A1* | 5/2012 | Yen | H04B 1/0064 |
| | | | | 455/90.2 |
| 2013/0185373 | A1* | 7/2013 | Vandwalle | H04W 56/0015 |
| | | | | 709/208 |
| 2013/0201316 | A1* | 8/2013 | Binder | H04L 67/12 |
| | | | | 348/77 |
| 2014/0170992 | A1* | 6/2014 | Wang | H01Q 1/243 |
| | | | | 455/73 |
| 2015/0103685 | A1* | 4/2015 | Butchko | H04L 43/50 |
| | | | | 370/252 |
| 2015/0105121 | A1* | 4/2015 | Emmanuel | H04W 28/0215 |
| | | | | 455/553.1 |
| 2015/0271829 | A1* | 9/2015 | Amini | H04W 24/02 |
| | | | | 370/329 |
| 2016/0066326 | A1* | 3/2016 | Choi | H04W 72/0453 |
| | | | | 370/329 |
| 2016/0198198 | A1* | 7/2016 | Iwami | H04N 21/2385 |
| | | | | 725/116 |
| 2016/0309481 | A1* | 10/2016 | Verma | H04L 65/1069 |

OTHER PUBLICATIONS

European Search Report dated Jan. 31, 2017 issued in counterpart application No. 16172615.3-1854, 8 pages.

* cited by examiner

ELECTRONIC DEVICE AND METHOD FOR PERFORMING WIRELESS COMMUNICATION OF THE SAME

PRIORITY

This application claims priority under 35 U.S.C. § 119(a) to Korean Patent Application Serial No. 10-2015-0137580, filed in the Korean Intellectual Property Office on Sep. 30, 2015, the entire content of which is incorporated herein by reference.

BACKGROUND

1. Field of the Disclosure

The present disclosure relates generally to an electronic device that supports short-range wireless communication with an external device using a first band and a second band, and more particularly, to an electronic device and method that selects a frequency band in accordance with the characteristic of a function executed in the electronic device or the characteristic of a surrounding network environment of the electronic device and performs short-range wireless communication through the selected frequency band.

2. Description of the Related Art

Various standard technologies for short-range network communication, such as wireless local area networking (WLAN), Bluetooth (BT), near field communication (NFC), and Bluetooth low energy (BLE), may be mounted in an electronic device, and a user of the electronic device can wirelessly use various kinds of services using such standard technologies. Wi-Fi, a type of WLAN technology, wirelessly transmits and receives data in accordance with Institute of Electrical and Electronics Engineers (IEEE) 802.11 or IEEE 802.11x (here, x is a, b, g, n, ac, or ad) standards, and can perform wireless communication through 2.4 GHz band or 5 GHz band. Dual Wi-Fi that is a kind of Wi-Fi technology may transmit and receive data simultaneously using 2.4 GHz band and 5 GHz band.

When an electronic device performs wireless communication in a time division method using 2.4 GHz band or 5 GHz band through a Wi-Fi module, only one band can be used at a specific time, and thus data transmission/reception speed may be lowered. Further, since only one frequency band can be used in the time division method, current for retrieving the frequency band is consumed whenever the frequency band is changed. Further, when performing wireless communication without considering the characteristics of the functions or the characteristics of the surrounding network environment although the wireless communication is performed simultaneously using the 2.4 GHz band and 5 GHz band, wireless resources may be inappropriately allocated to the surrounding network environment.

SUMMARY

Aspects of the present disclosure are to address at least the above mentioned problems and/or disadvantages and to provide at least the advantages described below.

An aspect of the present disclosure provides an apparatus and a method that can select one frequency band of a first band and a second band on the basis of at least one of the characteristics of a function and surrounding network environment information and can perform the function through the selected frequency band.

In accordance with an aspect of the present disclosure, an electronic device is provided. The electronic device includes a communication module configured to support short-range wireless communication with an external device using a first band and a second band; a processor electrically connected to the communication module; and a memory electrically connected to the processor, wherein the memory, when executed, stores instructions to cause the processor to confirm at least one characteristic of a function and surrounding network environment information in response to a function performance request, and perform the function through one of the first band and the second band of the external device based on at least one of the characteristic of the function and the surrounding network environment information.

In accordance with another aspect of the present disclosure, a method for performing wireless communication of an electronic device that supports short-range wireless communication with an external device using a first band and a second band is provided. The method includes confirming at least one characteristic of a function and surrounding network environment information in response to a function performance request; and performing the function through one of the first band and the second band of the external device based on the at least one of the characteristic of the function and the surrounding network environment information.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF EMBODIMENTS OF THE PRESENT DISCLOSURE

Figure 1:
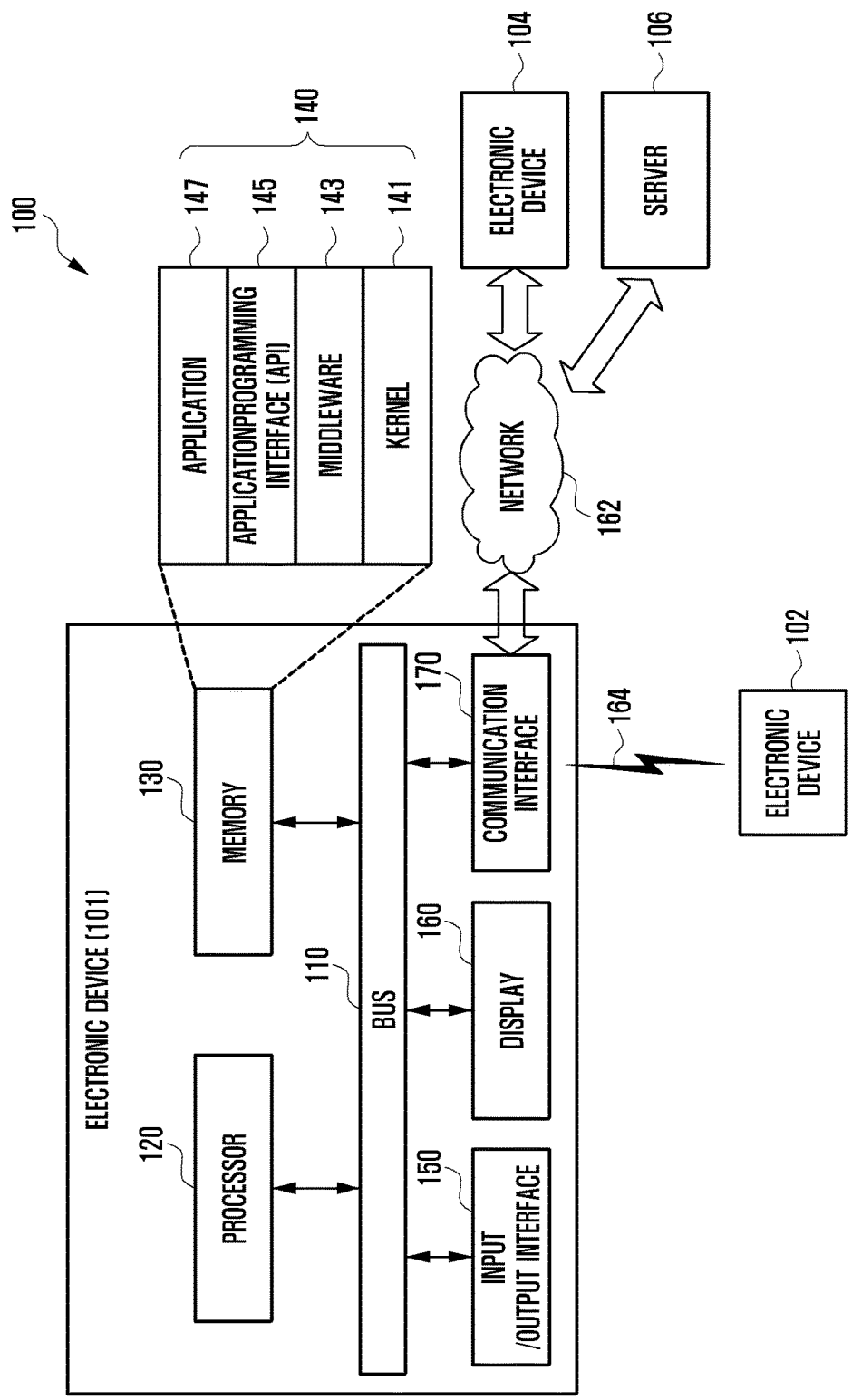
FIG. 1 is a diagram illustrating a network environment including an electronic device according to an embodiment of the present disclosure.

Hereinafter, embodiments of the present disclosure are described in detail with reference to the accompanying drawings. In the following description of embodiments, descriptions of well-known functions and structures incorporated herein may be omitted to avoid obscuring the subject matter of the present disclosure and for clarity and conciseness.

The following description with reference to the accompanying drawings is provided to assist in a comprehensive understanding of embodiments of the present disclosure as defined by the claims and their equivalents. The following description includes various specific details to assist in that understanding but these are to be regarded as mere examples. Various changes and modifications of the embodiments described herein can be made without departing from the scope and spirit of the present disclosure.

Expressions such as "include" and "may include", as used herein, may indicate the presence of the disclosed functions, operations, and constituent elements, but do not limit one or more additional functions, operations, and constituent elements. Herein, terms such as "include" and/or "have" may be construed to indicate a certain characteristic, number, step, operation, constituent element, component or a combination thereof, but may not be construed to exclude the existence of, or a possibility of, one or more other additional characteristics, numbers, steps, operations, constituent elements, components or combinations thereof.

In the present disclosure, the expression "and/or" includes any and all combinations of the associated listed words. For example, the expression "A and/or B" may include A, include B, or both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions merely distinguish an element from the other elements. For example, a first user device and a second user device indicate different user devices although both devices are user devices. For example, a first element could be referred to as a second element, and similarly, a second element could also be referred to as a first element without departing from the scope of the present disclosure.

When is referred to as being "connected" to or "accessed" by to other component, not only is the component directly connected to or accessed by the other component, but also there may exist another component between them. Meanwhile, when a component is referred to as being "directly connected" or "directly accessed" to other component, it should be understood that there is no component therebetween.

The terms used in the present disclosure are merely used to describe specific embodiments of the present disclosure, and are not intended to limit the present disclosure. As used herein, the singular forms of terms are intended to include the plural forms as well, unless the context clearly indicates otherwise.

In this disclosure, an electronic device may be able to perform a communication function. For example, an electronic device may be a smart phone, a tablet personal computer (PC), a mobile phone, a video phone, an e-book reader, a desktop PC, a laptop PC, a netbook computer, a personal digital assistant (PDA), a portable multimedia player (PMP), a Moving Picture Experts Group (MPEG) audio layer 3 (MP3) player, a portable medical device, a digital camera, or a wearable device (e.g., a head-mounted device (HMD) such as electronic glasses, electronic clothes, an electronic bracelet, an electronic necklace, an electronic appcessory, or a smart watch).

According to some embodiments of the present disclosure, an electronic device may be a smart home appliance that involves a communication function. For example, an electronic device may be a television (TV), a digital video disk (DVD) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to some embodiments of the present disclosure, an electronic device may be a medical device (e.g., magnetic resonance angiography (MRA), magnetic resonance imaging (MRI), computed tomography (CT), ultrasonography, etc.), a navigation device, a global positioning system (GPS) receiver, an event data recorder (EDR), a flight data recorder (FDR), a car infotainment device, electronic equipment for a ship (e.g., a marine navigation system, a gyrocompass, etc.), avionics, security equipment, or an industrial or home robot.

According to some embodiments of the present disclosure, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. The above-mentioned electronic devices are merely listed as examples and not to be considered as a limitation of this disclosure.

FIG. 1 is a block diagram illustrating a network environment including therein an electronic device in accordance with an embodiment of the present disclosure.

Referring to FIG. 1, an electronic device 101 in a network environment 100 may include, but is not limited to, a bus 110, a processor 120, a memory 130, an input/output interface 150, a display 160, and a communication interface 170.

The bus 110 may be a circuit designed for connecting the above-discussed elements and communicating data (e.g., a control message) between such elements.

The processor 120 may receive commands from the other elements (e.g., the memory 130, the input/output interface 150, the display 160, or the communication interface 170, etc.) through the bus 110, interpret the received commands, and perform the arithmetic or data processing based on the interpreted commands.

The memory 130 may store therein commands or data received from or created at the processor 120 or other elements (e.g., the input/output interface 150, the display 160, or the communication interface 170, etc.). The memory 130 may include programming modules 140 such as a kernel 141, a middleware 143, an application programming interface (API) 145, and an application 147. Each of the programming modules may be composed of software, firmware, hardware, and any combination thereof.

The kernel 141 may control or manage system resources (e.g., the bus 110, the processor 120, the memory 130, etc.) used to execute operations or functions implemented by other programming modules (e.g., the middleware 143, the API 145, and the application 147). Also, the kernel 141 may provide an interface capable of accessing and controlling or managing the individual elements of the electronic device 101 by using the middleware 143, the API 145, or the application 147.

The middleware 143 may operate between the kernel 141 and either one or both of the API 145 and the application 147, in such a manner that the API 145 or the application 147 communicates with the kernel 141 and exchanges data therewith. Also, in relation to work requests received from one or more applications 147 and/or the middleware 143, for example, may perform load balancing of the work requests by using a method of assigning a priority, in which system resources (e.g., the bus 110, the processor 120, the memory 130, etc.) of the electronic device 101 can be used, to at least one of the one or more applications 147.

The API 145 is an interface through which the application 147 is capable of controlling a function provided by the kernel 141 or the middleware 143, and may include, for example, at least one interface or function for file control, window control, image processing, character control, and the like.

The input/output interface 150 may deliver commands or data, entered by a user through an input/output unit (e.g., a sensor, a keyboard, or a touch screen), to the processor 120, the memory 130, or the communication interface 170 via the bus 110.

The display module 160 may include, for example, a liquid crystal display (LCD), a light emitting diode (LED) display, an organic LED (OLED) display, a micro electro mechanical system (MEMS) display, or an electronic paper display. The display 160 may display various types of contents (e.g., text, images, videos, icons, or symbols) for users. The display module 160 may include a touch screen, and may receive, for example, a touch, gesture, proximity, or hovering input by using an electronic device or a part of the user's body.

The communication interface 170 may perform a communication between the electronic device 101 and any external electronic device (e.g., the electronic device 104 of the server 106). For example, the communication interface 170 may communicate with any external device by being connected with a network 162 through a wired or wireless communication.

The wireless communication may include, but not limited to, at least one of Wi-Fi, Bluetooth (BT), near field communication (NFC), global navigation satellite system (GNSS), or a cellular communication (e.g., long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), etc.).

GNSS may include at least one of GPS, global navigation satellite system (Glonass), Beidou Navigation Satellite System (Beidou), Galileo, or the European global satellite-based navigation system. The terms "GPS" and the "GNSS" may be used interchangeably herein.

The wired communication may include, but not limited to, at least one of universal serial bus (USB), high definition multimedia interface (HDMI)), recommended standard 232 (RS-232), or plain old telephone service (POTS).

The network 162 includes, as a telecommunications network, at least one of a computer network (e.g., a local area network (LAN) or a wide area network (WAN)), the Internet, and a telephone network.

The first and second external electronic devices 102 and 104 may be of the same or different type of electronic device as the type of the electronic device 101. The server 106 may include a group of one or more servers.

Some or all of operations performed in the electronic device 101 may be performed in one or more other electronic devices 102 or 104 or the server 106. When the electronic device 101 performs a certain function or service automatically or in response to a request, the electronic device 101 may request at least a portion of functions related to the function or service from another electronic device 102 or 104 or the server 106 instead of or in addition to performing the function or service for itself. Either of the other electronic devices 102 or 104 or the server 106 may perform the requested function or additional function, and may transfer a result of the performance to the electronic device 101. The electronic device 101 may additionally process the received result to provide the requested function or service. To this end, for example, a cloud computing technology, a distributed computing technology, or a client-server computing technology may be used.

Figure 2:
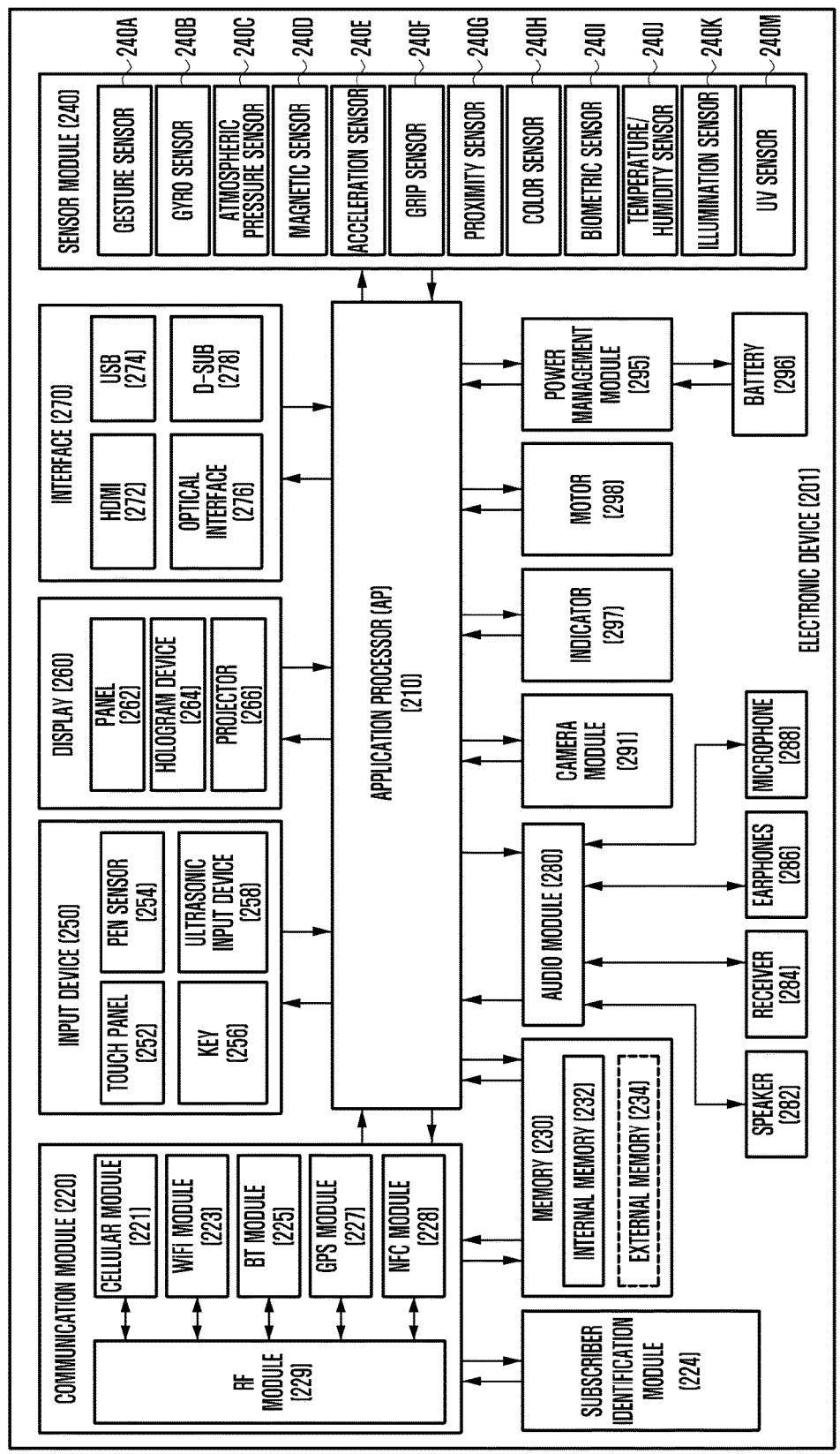
FIG. 2 is a block diagram illustrating an electronic device according to an embodiment of the present disclosure.

FIG. 2 is a block diagram illustrating an electronic device according to an embodiment of the present disclosure.

Referring to FIG. 2, an electronic device 201 may form, for example, all or a part of the electronic device 101 shown in FIG. 1. the electronic device 201 may include at least one application processor (AP) 210, a communication module 220, a subscriber identification module (SIM) module 224, a memory 230, a sensor module 240, an input device 250, a display 260, an interface 270, an audio module 280, a camera module 291, a power management module 295, a battery 296, an indicator 297, and a motor 298.

The AP 210 may drive an operating system or applications, control a plurality of hardware or software components connected thereto, and also perform processing and operation for various data including multimedia data. The AP 210 may be formed of a system-on-chip (SoC), for example. According to an embodiment of the present disclosure, the AP 210 may further include a graphic processing unit (GPU).

The communication module 220 (e.g., the communication interface 170) may perform a data communication with any other electronic device (e.g., the electronic device 104 or the server 106) connected to the electronic device 201 (e.g., the electronic device 101) through the network. According to an embodiment of the present disclosure, the communication module 220 may include therein a cellular module 221, a Wi-Fi module 223, a BT module 225, a GNSS module 227, an NFC module 228, and a radio frequency (RF) module 229.

The cellular module 221 may offer a voice call, a video call, a message service, an internet service, and the like through a communication network (e.g., LTE, LTE-A, CDMA, WCDMA, UMTS, WiBro, or GSM, etc.). Additionally, the cellular module 221 may perform identification and authentication of the electronic device in the communication network, using the SIM module 224. According to an embodiment of the present disclosure, the cellular module 221 may perform at least a part of functions that the AP 210 can provide. For example, the cellular module 221 may perform at least part of a multimedia control function.

Each of the Wi-Fi module 223, the BT module 225, the GNSS module 227 and the NFC module 228 may include a processor for processing data transmitted or received therethrough. Although FIG. 2 shows the cellular module 221, the Wi-Fi module 223, the BT module 225, the GNSS module 227 and the NFC module 228 as different components, at least a part of these components may be contained in a single integrated circuit (IC) chip or a single IC package according to an embodiment of the present disclosure.

The RF module 229 may transmit and receive data, e.g., RF signals or any other electric signals. The RF module 229 may include a transceiver, a power amplifier module (PAM), a frequency filter, a low noise amplifier (LNA), and the like. Although FIG. 2 shows that the cellular module 221, the Wi-Fi module 223, the BT module 225, the GNSS module 227 and the NFC module 228 share the RF module 229, at least one of these components may perform transmission and reception of RF signals through a separate RF module according to an embodiment of the present disclosure.

The SIM module 224 may include, for example, an embedded SIM and/or a SIM card, and may include unique identification information (e.g., an integrated circuit card identifier (ICCID)) or subscriber information (e.g., international mobile subscriber identity (IMSI)).

The memory 230 may include an internal memory 232 and an external memory 234. The memory 230 may be, for example, the memory 130 illustrated in FIG. 1. The internal memory 232 may include, for example, at least one of a volatile memory (e.g., a dynamic random access memory (RAM) (DRAM), a static RAM (SRAM), a synchronous dynamic RAM (SDRAM), etc.), and a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a not AND (NAND) flash memory, a Not OR (NOR) flash memory, etc.). According to an embodiment of the present disclosure, the internal memory 232 may be in the form of a solid state drive (SSD).

The external memory 234 may further include a flash drive, for example, a compact flash (CF), a secure digital (SD), a micro-secure digital (Micro-SD), a mini-secure digital (Mini-SD), an extreme digital (xD), a memory stick, and the like. The external memory 234 may be functionally connected to the electronic device 201 through various interfaces.

According to an embodiment of the present disclosure, the memory 230, when executed, may store instructions to cause the processor 210 to confirm the characteristics of a function and surrounding network environment information, in response to a function performance request, and to perform the function through one of the first band and the second band of the external device on the basis of at least one of the characteristic of the function and the surrounding network environment information.

According to an embodiment of the present disclosure, the memory 230 may store instructions to cause the processor 210 to perform a first function through the first band if the function includes the first function and to perform a second function through the second band if the function includes the second function.

According to an embodiment of the present disclosure, the memory 230 may store instructions to cause the processor 210 to confirm a communication type of the function, and to perform the function through the first band if the communication type of the function is a message transmission/reception type, whereas to perform the function through the second band if the communication type of the function is a streaming type or a file transmission/reception type.

According to an embodiment of the present disclosure, the memory 230 may store instructions to cause the processor 210 to confirm a data transfer rate of the function, and to perform the function through the first band if the data transfer rate is less than a predetermined value, whereas to perform the function through the second band if the data transfer rate is at least equal to the predetermined value.

According to an embodiment of the present disclosure, the memory 230 may store instructions to cause the processor 210 to confirm at least one value of the received signal strength indicator (RSSI), modulation and coding scheme (MCS), and/or stream of at least one external device, and to perform the function through one of the first band and the second band of the external device, which is determined to have the highest signal strength.

The sensor module 240 may measure physical quantity or sense an operating status of the electronic device 200, and then convert measured or sensed information into electric signals. The sensor module 240 may include, for example, at least one of a gesture sensor 240A, a gyro sensor 240B, an atmospheric sensor 240C, a magnetic sensor 240D, an acceleration sensor 240E, a grip sensor 240F, a proximity sensor 240G, a color sensor 240H (e.g., RGB (Red, Green, Blue) sensor), a biometric sensor 240I, a temperature-humidity sensor 240J, an illumination sensor 240K, and a UV (ultraviolet) sensor 240M. Additionally or alternatively, the sensor module 240 may include, e.g., an E-nose sensor, an EMG (electromyography) sensor, an EEG (electroencephalogram) sensor, an ECG (electrocardiogram) sensor, an IR (infrared) sensor, an iris scan sensor, or a finger scan sensor. Also, the sensor module 240 may include a control circuit for controlling one or more sensors equipped therein.

The input unit 250 may include a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. The touch panel 252 may further include a tactile layer. In this case, the touch panel 252 may offer a tactile feedback to a user.

The pen sensor 254 (e.g., a digital pen sensor), for example, may be implemented by using a method identical or similar to a method of receiving a touch input from the user, or by using a separate sheet for recognition. For example, a key pad or a touch key may be used as the keys 256. The ultrasonic input unit 258 enables the terminal to sense a sound wave by using a microphone 288 of the terminal through a pen generating an ultrasonic signal, and to identify data.

According to an embodiment of the present disclosure, the input device 250 may receive an input for designating one of the first band and the second band to be used for the function.

The display 260 (e.g., the display 150) may include a panel 262, a hologram 264, or a projector 266. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 201. According to an embodiment of the present disclosure, the display 260 may further include a control circuit for controlling the panel 262, the hologram 264, and the projector 266.

The interface 270 may include, for example, an HDMI 272, a USB 274, an optical interface 276, or a D-subminiature (D-sub) 278. The interface 270 may be contained, for example, in the communication interface 170 shown in FIG. 1. Additionally or alternatively, the interface 270 may include, for example, a mobile high-definition link (MHL) interface, an SD card/multi-media card (MMC) interface, or an infrared data association (IrDA) interface.

The audio module 280 may perform a conversion between sounds and electric signals. At least part of the audio module 280 may be contained, for example, in the input/output interface 150 shown in FIG. 1. The audio module 280 may process sound information inputted or outputted through a speaker 282, a receiver 284, an earphone 286, or the microphone 288.

The camera module 291 is a device capable of obtaining still images and moving images. According to an embodiment of the present disclosure, the camera module 291 may include at least one image sensor (e.g., a front sensor or a rear sensor), a lens, an image signal processor (ISP), or a flash (e.g., a light emitting diode (LED) or xenon lamp).

The power management module 295 may manage electric power of the electronic device 201. The power management module 295 may include, for example, a power management integrated circuit (PMIC), a charger IC, or a battery gauge. The PMIC may be mounted to, for example, an IC or an SoC semiconductor. Charging methods may be classified into a wired charging method and a wireless charging method. A wireless charging type may include, for example, a magnetic resonance type, a magnetic induction type, or an electromagnetic type. Any additional circuit for a wireless charging may be further used such as a coil loop, a resonance circuit, or a rectifier. The battery gauge may measure the residual amount of the battery 296 and a voltage, current or temperature in a charging process. The battery 296 may store or create electric power therein and supply electric power to the electronic device 200. The battery 296 may be, for example, a rechargeable battery or a solar battery.

The indicator 297 may show thereon a current status (e.g., a booting status, a message status, or a recharging status) of the electronic device 201 or of a part thereof (e.g., the AP 210). The motor 298 may convert an electric signal into a mechanical vibration. The electronic device 201 may include a specific processor (e.g., a GPU) for supporting a mobile TV. This processor may process media data that comply with standards of digital multimedia broadcasting (DMB), digital video broadcasting (DVB), or media flow.

Each of the above-described elements of the electronic device disclosed herein may be formed of one or more components, and the name of each element may vary according to the type of the electronic device. The electronic device disclosed herein may be formed of at least one of the above-discussed elements without some elements or with additional other elements. Some of the elements may be integrated into a single entity that still performs the same functions as the respective functions of such elements before integrated.

Figure 3:
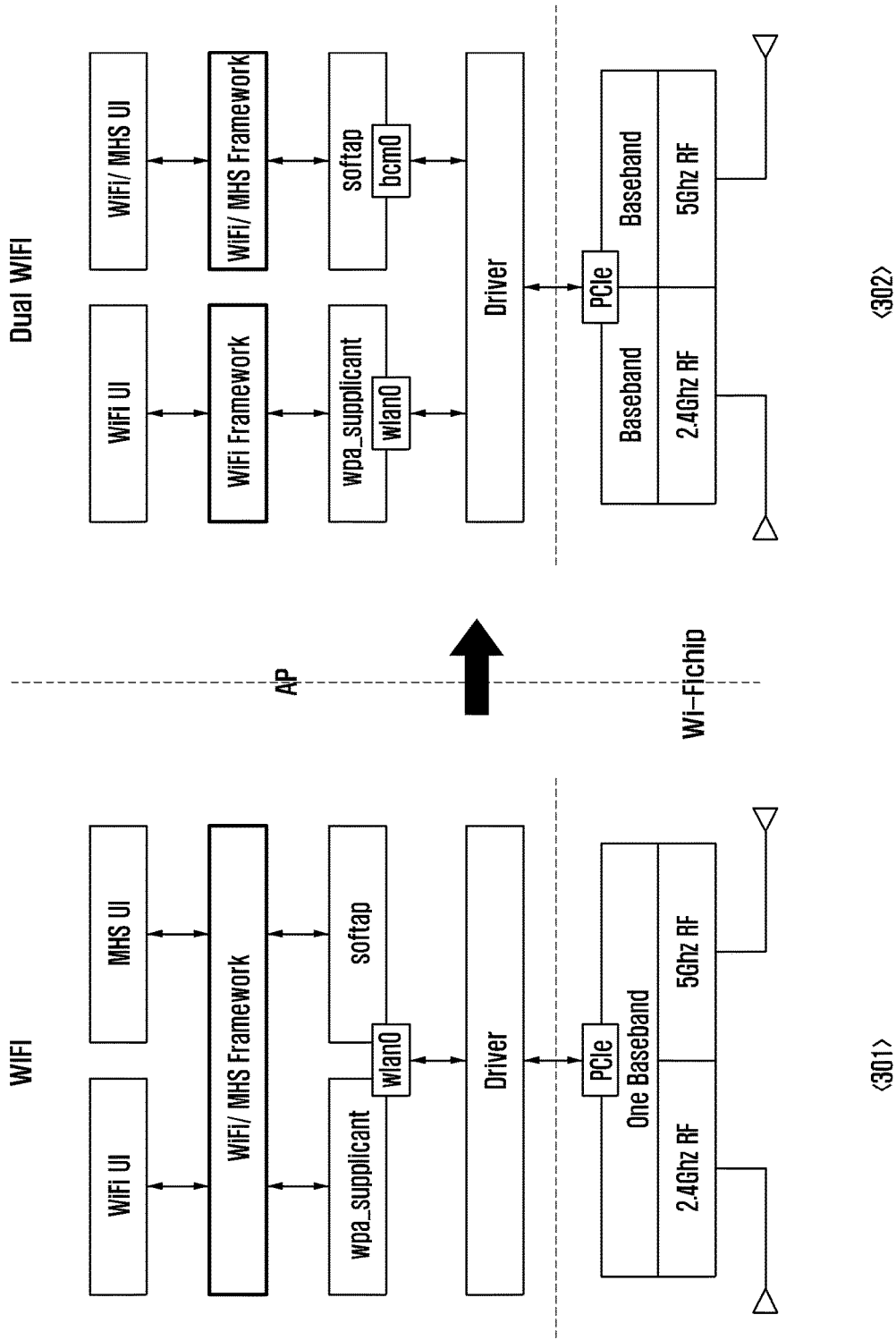
FIG. 3 is a diagram illustrating a method in which an electronic device performs dual Wi-Fi according to an embodiment of the present disclosure.

FIG. 3 is a diagram illustrating method in which an electronic device according to performs dual Wi-Fi according to embodiment of the present disclosure.

Referring to FIG. 3, according to a first method 301, a Wi-Fi function may be formed through an AP layer and a chip layer that are divided from each other. The AP layer may include a Wi-Fi user interface (UI), a mobile hot spot (MHS) (UI, and a Wi-Fi/MHS framework module that communicates with the corresponding UI. The Wi-Fi/MHS framework module may communicate with a wpa_supplicant module and a softap module. The wpa_supplicant module and the softap module may communicate with a Wi-Fi chip through a wlan0 interface. Accordingly, the Wi-Fi chip in the related art can use one base band only, and can selectively use 2.4 GHz band and 5 GHz band in accordance with a user's request or an application's request.

Referring to a second method 302 of FIG. 3, unlike Wi-Fi configuration according to the first method 301, in which the Wi-Fi/MHS framework module is configured as one module, the dual Wi-Fi may be composed of a Wi-Fi framework module for the Wi-Fi function and a Wi-Fi/MHS framework module that can use the Wi-Fi function and the MHS UI. The Wi-Fi framework module and the Wi-Fi/MHS framework module may be individually connected to respective base bands of the Wi-Fi chip through the wlan0 interface and bcm0 interface, and may simultaneously use a 2.4 GHz band and a 5 GHz band. A wpa_supplicant module and a softap module illustrated in the second method 302 may take charge of Wi-Fi connection authentication in a client device and a hot spot device. The electronic device 201 that uses the dual Wi-Fi according to an embodiment of the present disclosure may selectively use two Wi-Fi bands or may simultaneously use the two bands.

Figure 4:
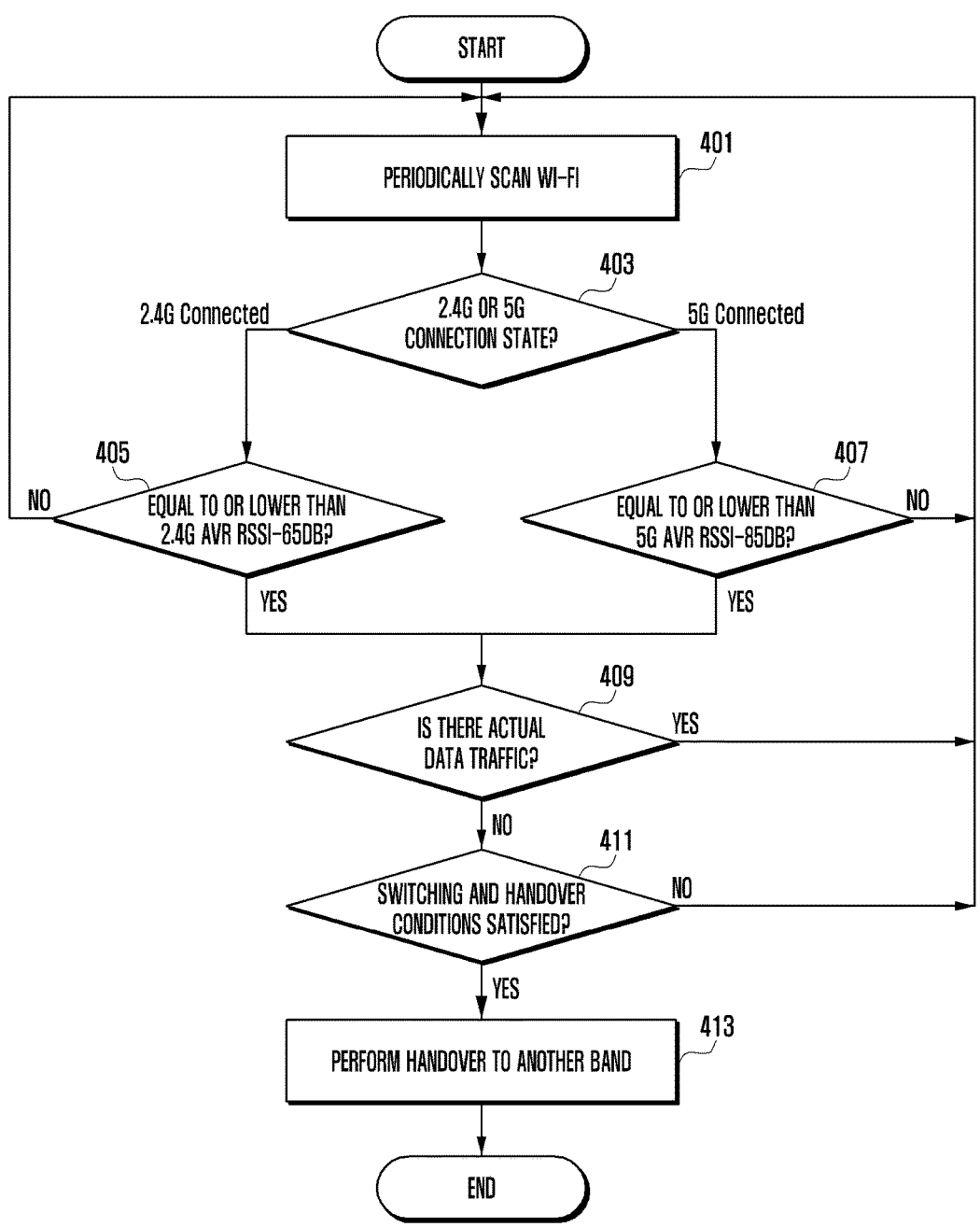
FIG. 4 is a flowchart illustrating operation of an electronic device according to an embodiment of the present disclosure in accordance with an RSSI signal strength.

FIG. 4 is a flowchart illustrating operation of an electronic device according to an embodiment of the present disclosure in accordance with an RSSI signal strength.

Referring to FIG. 4, a Wi-Fi function according to the related art can use only one frequency band at a time. Accordingly, while a first band (e.g., 2.4 GHz band) is in use, a second band (e.g., 5 GHz band) is unable to be used. In the related art, if switching of available APs is required while the Wi-Fi is in use, handover operation may be performed on the basis of the frequency band use limits as described above.

At step 401, the electronic device 201 may scan the respective frequency bands of the Wi-Fi function at predetermined time intervals.

At step 403, the electronic device 201 may start scanning to check whether the electronic device 201 can be connected to 2.4 GHz frequency band or 5 GHz frequency band through analysis of surrounding Wi-Fi AP signals. The electronic device 201 may be connected to the frequency band of one scanned AP.

At step 405, if the frequency band of the connected AP is 2.4 GHz, the electronic device 201 may determine whether the signal strength is less than −65 dBm, and if the signal strength is at least equal to −65 dBm, the electronic device 201 may scan the respective frequency bands at the predetermined time intervals as at step 401 while maintaining the connection state to the 2.4 GHz frequency band. At step 407, the electronic device 201 may determine whether the signal strength is less than −85 dBm when the frequency band of the connected AP is 5 GHz, and if the signal strength is at least equal to −85 dBm, the electronic device 201 may scan the respective frequency bands at the predetermined time intervals as at step 401 while maintaining the connection state to the 5 GHz frequency band. If the frequency band of the connected AP is 2.4 GHz and the signal strength is less than −65 dBm at step 405, or if the frequency band of the connected AP is 5 GHz and the signal strength is less than −85 dBm at step 407, the electronic device 201 may confirm whether there is a data traffic for handover to another frequency band at step 409. The handover operation becomes possible when there is no data traffic during execution of the Wi-Fi function. At step 411, the electronic device 201 may confirm whether a frequency band switching condition and a handover condition are appropriate. If the above-described conditions are not appropriate, the electronic device 201 may rescan the surrounding Wi-Fi AP signal with respect to the 2.4 GHz frequency band or 5 GHz frequency band.

At step 413, if there is no data traffic and the switching and handover conditions are satisfied in a state where the frequency band of the connected AP is 2.4 GHz and the signal strength is less than −65 dBm, the electronic device 201 may perform the handover to the 5 GHz frequency band. Further, if there is not the data traffic and the switching and handover conditions are satisfied in a state where the frequency band of the connected AP is 5 GHz and the signal strength is less than −85 dBm, the electronic device 201 may perform the handover to the 2.4 GHz frequency band.

Figure 5:
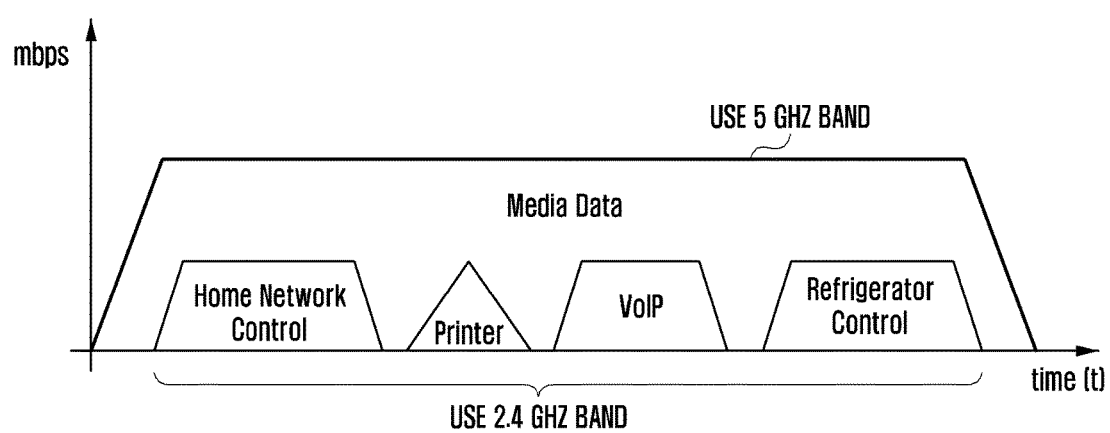
FIG. 5 is a graph illustrating data transfer rates with respect to time in two bands when an electronic device according to an embodiment of the present disclosure uses two bands through dual Wi-Fi.

FIG. 5 is a graph illustrating data transfer rates with respect to time in two bands when an electronic device according to an embodiment of the present disclosure uses two bands through dual Wi-Fi.

Referring to FIG. 5, the electronic device 201 may perform various functions, such as an application function and a Device-to-Device (D2D) connection function, through the communication module 220. For example, the electronic device 201 may execute a real-time streaming type moving image application through the Wi-Fi module 223, or may execute a solitary message transmission/reception type messenger application. Further, the electronic device 201 may perform a D2D connection, such as a screen mirroring function, through the Wi-Fi module 223. The electronic device 201 according to an embodiment of the present disclosure may select the first band or the second band on the basis of the characteristic of the function, and may perform the function through the selected band. The electronic device 201 may perform data transmission that is required to perform the function, and for example, referring to FIG. 5, in performing the function, the electronic device 201 may perform a function that does not require high data transfer rate, such as home network control, use of a printer, or a voice over internet protocol (VoIP), through the first band (e.g., 2.4 GHz band), and may perform a function that requires high data transfer rate, such as a real-time streaming type application, through the second band (e.g., 5 GHz band). The single Wi-Fi in the related art can use only one band, and if two or more functions are simultaneously used on the electronic device 201, a streaming loss due to Wi-Fi communication interference phenomenon between the functions in a band in which a communication channel is established may occur to reduce the data processing amount or to cause a service delay phenomenon to occur. For example, if a file transmission/reception type file download application and a message transmission/reception type messenger application are simultaneously executed, the file download speed may be lowered or the message transmission/reception speed may be lowered. The electronic device 201 according to an embodiment of the present disclosure can simultaneously use the first band and the second band through the dual Wi-Fi function, as illustrated in the graph of FIG. 5, and thus the electronic device 201 can simultaneously perform the file download application and the messenger application through different bands and can seamlessly provide the service.

Figure 6:
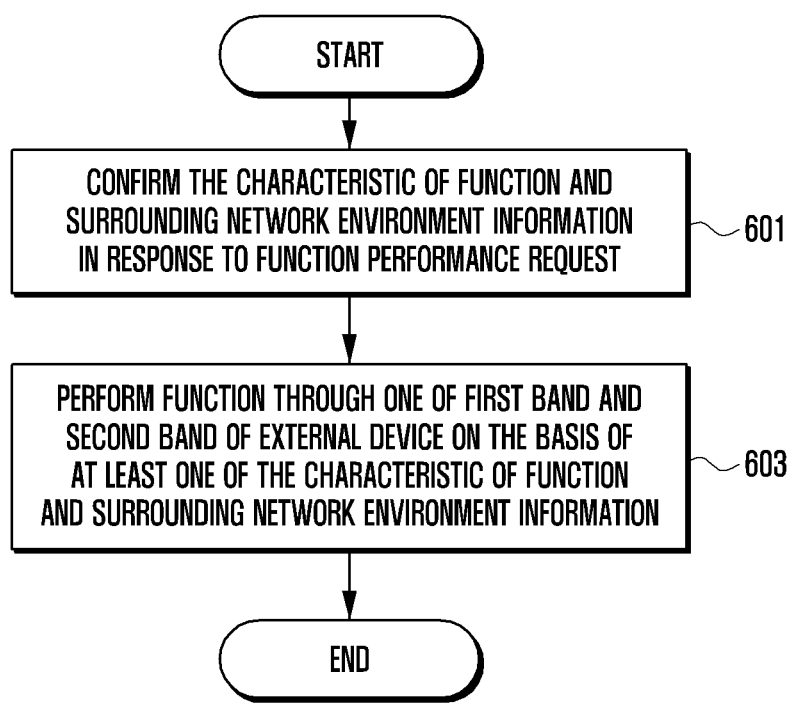
FIG. 6 is a flowchart illustrating the operation of an electronic device according to an embodiment of the present disclosure that performs a function through one of a first band and a second band on the basis of at least one of the characteristic of the function and surrounding network information.

FIG. 6 is a flowchart illustrating operation of an electronic device according to an embodiment of the present disclosure that performs a function through one of a first band and a second band on the basis of at least one of the characteristic of the function and surrounding network information.

At step 601, the electronic device 201 may confirm the characteristic of the function and the surrounding network environment information in response to the function performance request. The electronic device 201 may receive an input for requesting the function performance from a user. The function may correspond to various operations that can be performed on the electronic device 201, such as the application function and the D2D connection function.

The electronic device 201 according to an embodiment of the present disclosure may confirm the characteristic of the function in response to the function performance request. The electronic device 201 may confirm the characteristic of the function on the basis of the function communication type or the function data transfer rate. The function communication type may include a streaming type, a file transmission/reception type, and a message transmission/reception type. If the corresponding function performance request is received, the electronic device 201 may confirm the communication type of the function that is predetermined by a manufacturer or a user. The function data transfer rate may be the data amount that is transmitted or received through the corresponding function for a specific time. The electronic device 201 may pre-acquire the data transfer rate through analysis of the data transmission/reception amount for a time when the function is performed. For example, if the electronic device 201 performs the function for two hours and transmits/receives data of 500 Mbytes, the electronic device 201 can confirm that an average data transfer rate of the corresponding function is 250 Mbytes/hour.

The electronic device 201 according to an embodiment of the present disclosure can confirm the surrounding network environment information. The surrounding network environment information may confirm the signal strength between an external device (e.g., Access Point (AP) or another portable terminal) and the electronic device 201. The surrounding network environment information may include at least one of an RSSI, an MCS, and a stream value. The RSSI may be a numerical value of the strength of the signal that the electronic device 201 receives from the external device. Further, the MCS may be a numerical value that determines the data transfer rate/reception rate in Wi-Fi communication state. The electronic device 201 may confirm at least one value of the RSSI, MSC, and/or stream of at least one external device to know the strength of the signal that is received from the at least one external device.

At step 603, the electronic device 201 may perform the function through one of the first band and the second band of the external device on the basis of at least one of the characteristic of the function and the surrounding network environment information. The electronic device 201 may include a communication module that supports short-range wireless communication with the external device using the first band and the second band. The electronic device 201 may perform the short-range wireless communication through the Wireless-Fidelity (Wi-Fi) function.

The electronic device 201 according to an embodiment of the present disclosure may confirm the characteristic of the function, and may perform the function through one of the first band and the second band on the basis of the characteristic of the function. The electronic device 201 may confirm the characteristic of the function on the basis of the communication type of the function or the data transfer rate of the function. If the communication type of the function is the message transmission/reception type, the electronic device 201 may perform the function through the first band (e.g., 2.4 GHz band), whereas if the communication type of the function is the streaming type or the file transmission/reception type, the electronic device 201 may perform the function through the second band (e.g., 5 GHz band). If the data transfer rate is at least equal to the predetermined value (e.g., if the RSSI value is at least equal to −65 dBm), the electronic device 201 may perform the function through the first band, whereas if the data transfer rate is less than the predetermined value (e.g., if the RSSI value is less than −65 dBm), the electronic device 201 may perform the function through the second band.

The electronic device 201 according to an embodiment of the present disclosure may confirm the surrounding network environment information that includes at least one value of the RSSI, MSC, and/or stream in order to determine the strength of the signal between the external device and the electronic device 201. The electronic device 201 may perform the function through one of the first band and the second band of the external device, which is determined to have the highest signal strength. For example, if the strength RSSI of the signal that is received from a first external device is −30 dBm and the strength RSSI of the signal that is received from a second external device is −50 dBm, the electronic device 201 may compare the strengths of the signals with each other, and if it is determined that the strength of the signal that is received from the first external device is highest as the result of the comparison, the electronic device 201 may perform the function through the first band and/or the second band of the first external device.

Figure 7:
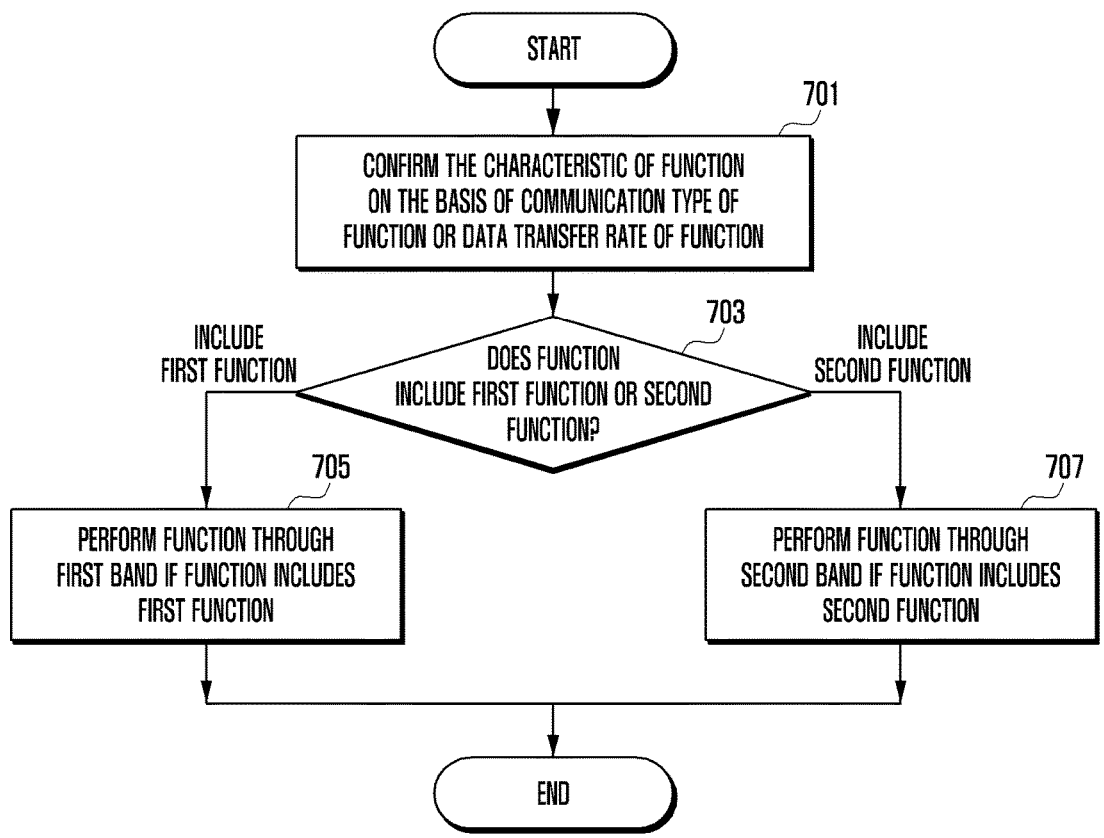
FIG. 7 is a flowchart illustrating operation of an electronic device according to an embodiment of the present disclosure that performs a function through one of a first band and a second band on the basis of the characteristic of the function.

FIG. 7 is a flowchart illustrating operation of an electronic device according to an embodiment of the present disclosure that performs a function through one of a first band and a second band on the basis of the characteristic of the function.

Referring to FIG. 7, at step 701, the electronic device 201 may confirm the characteristic of the function on the basis of the communication type of the function or the data transfer rate of the function. The electronic device 201 may confirm whether the function includes the first function or the second function in accordance with the communication type of the function for performing communication with the external device or the data transfer rate of the function. For example, if the communication type of the function is the message transmission/reception type, the electronic device 201 may determine that the function includes the first function, whereas if the communication type of the function is the streaming type of the file transmission/reception type, the electronic device 201 may determine that the function includes the second function. Further, if the data transfer rate of the function is less than the predetermined value, the electronic device 201 may determine that the function includes the first function, whereas if the data transfer rate is at least equal to the predetermined value, the electronic device 201 may determine that the function includes the second function. For example, if the electronic device 201 performs a D2D connection function with a smart TV through the Wi-Fi and transmits real-time video streaming to the smart TV, the electronic device 201 can confirm that the D2D connection function includes the first function. Further, if the electronic device 201 performs the application function with the AP through the Wi-Fi and performs communication through the message transmission/reception type, the electronic device 201 may confirm that the application function includes the second function.

At step 703, the electronic device 201 may confirm whether the function includes the first function or the second function through confirmation of the characteristic of the function.

At step 705, if the function includes the first function, the electronic device 201 may perform the function through the first band. The first band may include 2.4 GHz band. The electronic device 201 may establish the communication channel with the external device through at least one channel included in the first band. If the communication type of the function is the message transmission/reception type, the electronic device 201 may perform the above-described function through the first band. For example, if the electronic device 201 receives a messenger application performance request from a user, the electronic device 201 may perform messenger application through the first band. If the data transfer rate of the function is less than the predetermined value, the electronic device 201 may perform the above-described function through the first band. For example, if the function that is performed at the data transfer rate that is less than 50 Mbytes/hour is classified into the first function and the electronic device 201 performs the D2D connection function with a speaker through the Wi-Fi at the data transfer rate of 10 Mbytes/hour, the electronic device 201 may confirm that the D2D connection function includes the first function, and may perform the function through the first band.

At step 707, if the function includes the second function, the electronic device 201 may perform the function through the second band. The second band may include 5 GHz band. The electronic device 201 may establish the communication channel with the external device through at least one channel included in the second band. If the communication type of the function is the streaming type or the file transmission/reception type, the electronic device 201 may perform the above-described function through the second band. For example, if the electronic device 201 receives a file transmission/reception application performance request from a user, the electronic device 201 may perform file transmission/reception application through the second band. If the data transfer rate of the function is at least equal to the predetermined value, the electronic device 201 may perform the above-described function through the second band. For example, if the function that is performed at the data transfer rate that is at least equal to 50 Mbytes/hour is classified into the second function and the electronic device 201 performs the D2D connection function with a smart TV through the Wi-Fi at the data transfer rate of 100 Mbytes/hour, the electronic device 201 may confirm that the D2D connection function includes the second function, and may perform the function through the second band.

Figure 8:
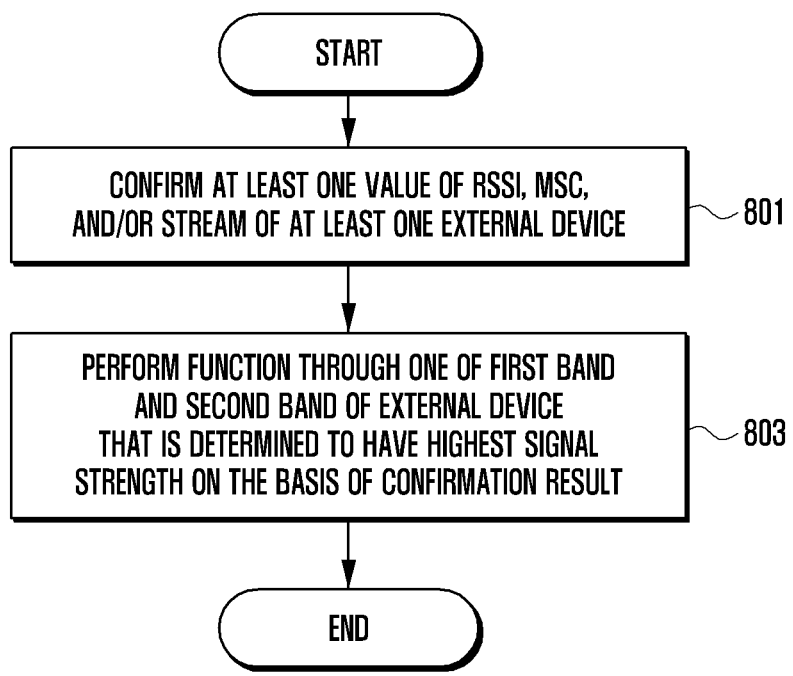
FIG. 8 is a flowchart illustrating operation of an electronic device according to an embodiment of the present disclosure that performs a function through one of a first band and a second band on the basis of surrounding network information.
Figure 9:
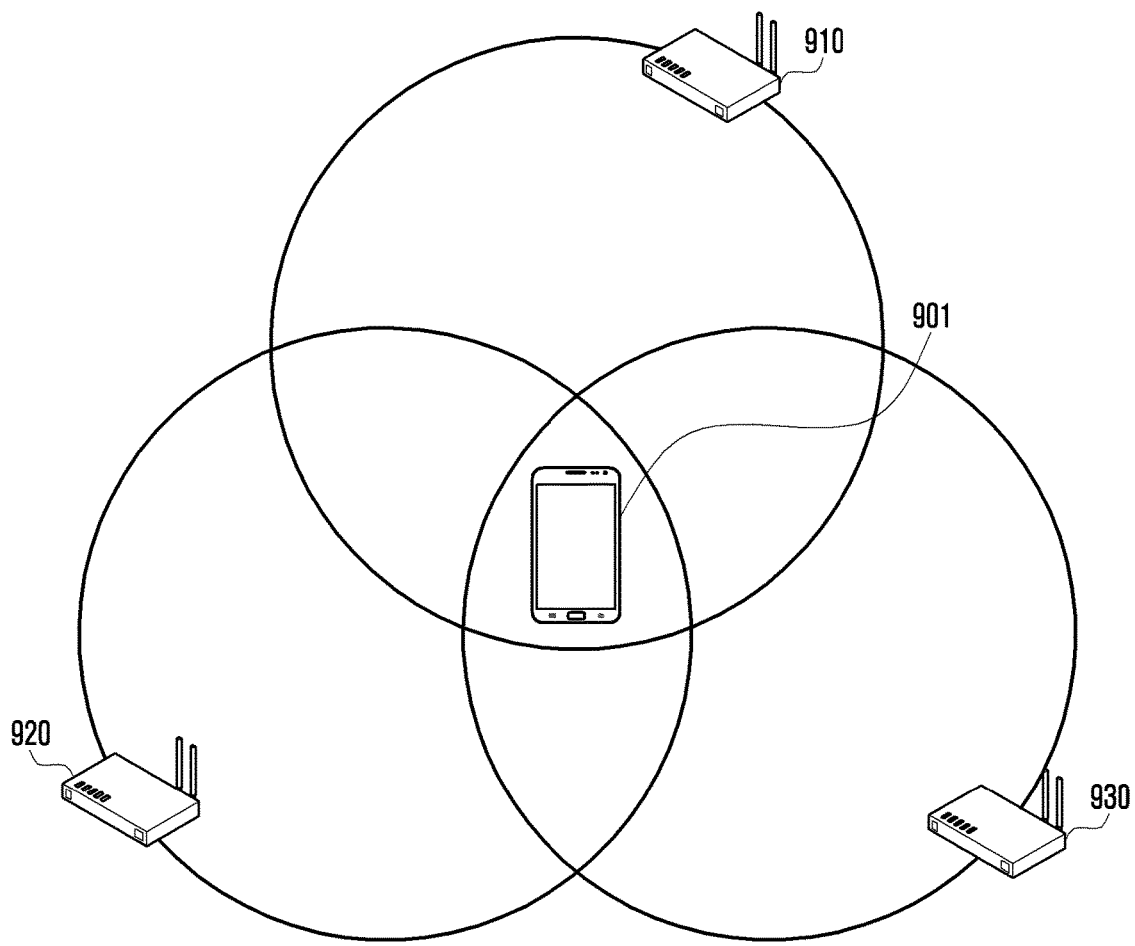
FIG. 9 is a diagram illustrating operation of an electronic device according to an embodiment of the present disclosure that receives a signal for wireless network communication from at least one external device.

FIG. 8 is a flowchart illustrating operation of an electronic device according to an embodiment of the present disclosure that performs a function through one of a first band and a second band on the basis of surrounding network information. FIG. 9 is a diagram illustrating operation of an electronic device according to an embodiment of the present disclosure that receives a signal for wireless network communication from at least one external device.

Referring to FIG. 8, at step 801, the electronic device 201 may confirm the surrounding network environment information. The surrounding network environment information may include at least one of an RSSI, an MCS, and a stream value. The RSSI may be a numerical value of the strength of the signal that the electronic device 201 receives from the external device. Further, the MCS may be a numerical value that determines the data transfer rate/reception rate in the Wi-Fi communication state. The electronic device 201 may confirm at least one value of the RSSI, MSC, and/or stream of at least one external device to know the strength of the signal that is received from the at least one external device. For example, referring to FIG. 9, if signals for wireless network communication are received from a first external device 910, a second external device 920, and a third external device 930, the electronic device can confirm the strengths of the signals of the external devices. The electronic device 910 can confirm the strength of the signal of the external device using at least one of the RSSI, MCS, and/or stream value.

At step 803, the electronic device 201 may perform the function through one of the first band and the second band of the external device, which is determined to have the highest signal strength on the basis of the result of the confirmation. The electronic device 201 may determine the external device that provides the highest signal strength through comparison of the confirmed resultant values with each other. The electronic device 201 may perform the function through the first band and/or the second band of the external device. For example, referring to FIG. 9, if the strength RSSI of the signal that is received from the first external device is −30 dBm, the strength RSSI of the signal that is received from the second external device 920 is −50 dBm, and the strength RSSI of the signal that is received from the third external device 930 is −35 dBm, the electronic device 201 may compare the strengths of the signals with each other, and if it is determined that the strength of the signal that is received from the first external device 910 is highest as the result of the comparison, the electronic device 201 may perform the function through the first band and/or the second band of the first external device 910. The electronic device 201 according to an embodiment of the present disclosure may compare the strengths of the signals with each other by bands of respective external devices, and may perform the function through the band having the highest signal strength. For example, the electronic device 201 may compare the signal strength of the first band of the first external device 910 with the signal strength of the first band of the second external device 920, and may perform the function through the band having a greater signal strength.

Figure 10:
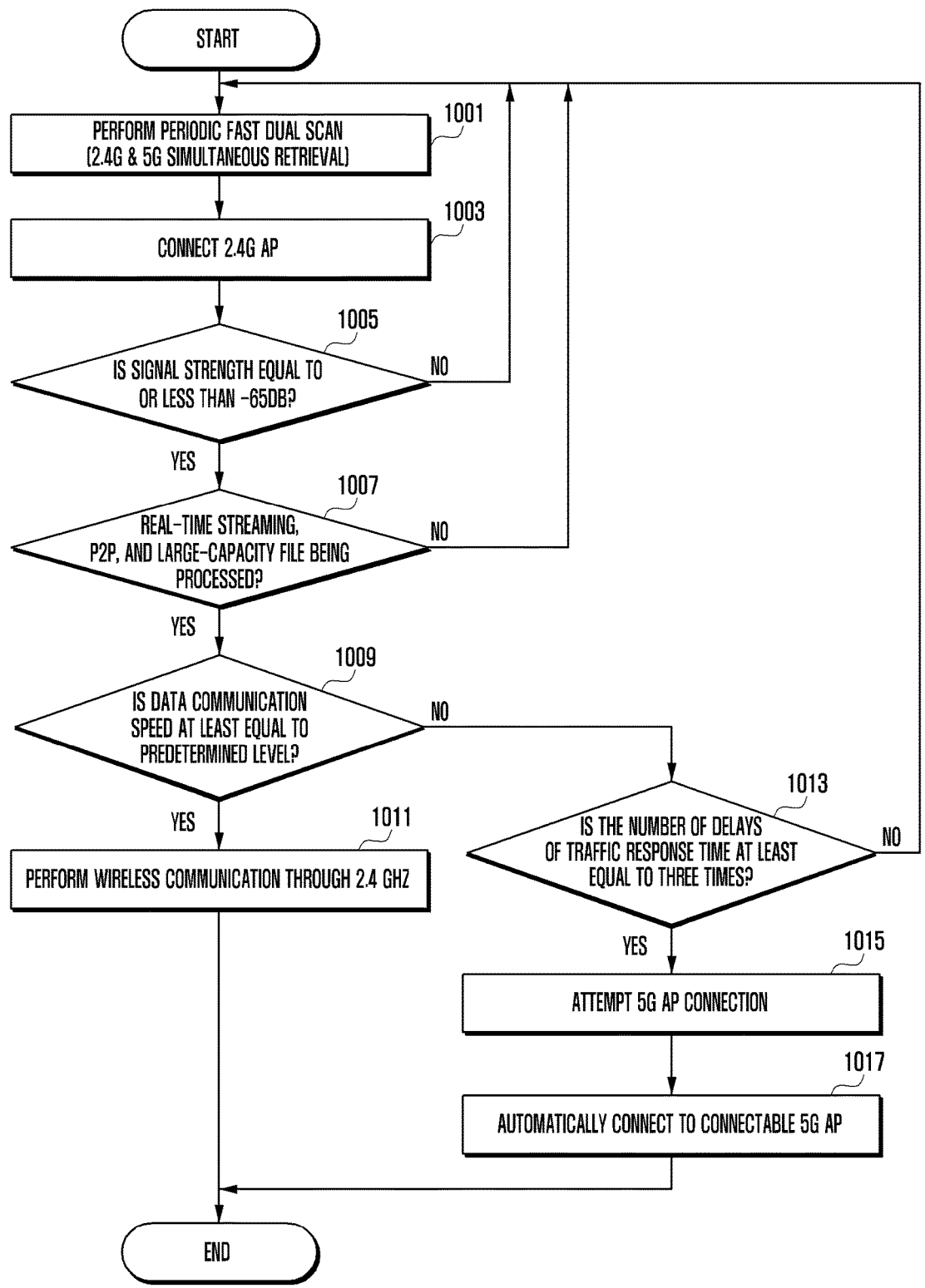
FIG. 10 is a flowchart illustrating operation of an electronic device according to an embodiment of the present disclosure that performs auto switch control between a first band and a second band for wireless communication while performing dual Wi-Fi function on the basis of surrounding network environment.

FIG. 10 is a flowchart illustrating operation of an electronic device according to an embodiment of the present disclosure that performs auto switch control between a first band and a second band for wireless communication while performing dual Wi-Fi function on the basis of surrounding network environment.

Referring to FIG. 10, at step 1001 in a method for performing a dual Wi-Fi function, the electronic device 201 may retrieve a surrounding Wi-Fi AP (i.e., perform fast dual scan) simultaneously using 2.4 GHz and 5 GHz frequency bands. Connection between the AP and the electronic device 201 may be performed in the order of frequency bands first retrieved during scanning of the 2.4 GHz and 5 GHz frequency bands.

At step 1003, if the 2.4 GHz frequency band is first scanned, the electronic device 201 may connect to the 2.4 GHz frequency band.

At step 1005, if the 2.4 GHz frequency band is first scanned, the electronic device 201 may determine whether the frequency signals strength is equal to or less than −65 dBm when connecting to the 2.4 GHz frequency band.

At step 1007, if the signal strength of the 2.4 GHz frequency band is equal to or less than −65 dBm, the electronic device 201 may determine the characteristics of the communication type being currently used (e.g., real-time streaming, P2P, and large capacity file download).

At step 1009, the electronic device 201 may determine the communication state of the current frequency band. For example, the electronic device 201 may determine whether the data communication speed is at least equal to a predetermined level (e.g., whether the data communication speed is at least equal to 2 Mbps) enough for users not to cause inconvenience.

At step 1011, if the data communication speed is at least equal to a predetermined level, the electronic device 201 may perform wireless communication using 2.4 GHz frequency band.

At step 1013, if it is determined that the data traffic speed is less than the predetermined level (e.g., data communication speed is less than 2 Mbps), the electronic device 201 may determine the number of delays of the data traffic response time.

At step 1015, if the number of delays of the data traffic response time is at least equal to a predetermined number of delays, the electronic device 201 may attempt the Wi-Fi connection through changing the frequency band to 5 GHz band.

At step 1017, the electronic device 201 may be automatically connected to one of a plurality of connectable 5 GHz frequency bands. Even when the frequency band is not required to be switched, and the connection is maintained, the Wi-Fi scanning operation may be periodically performed.

Figure 11:
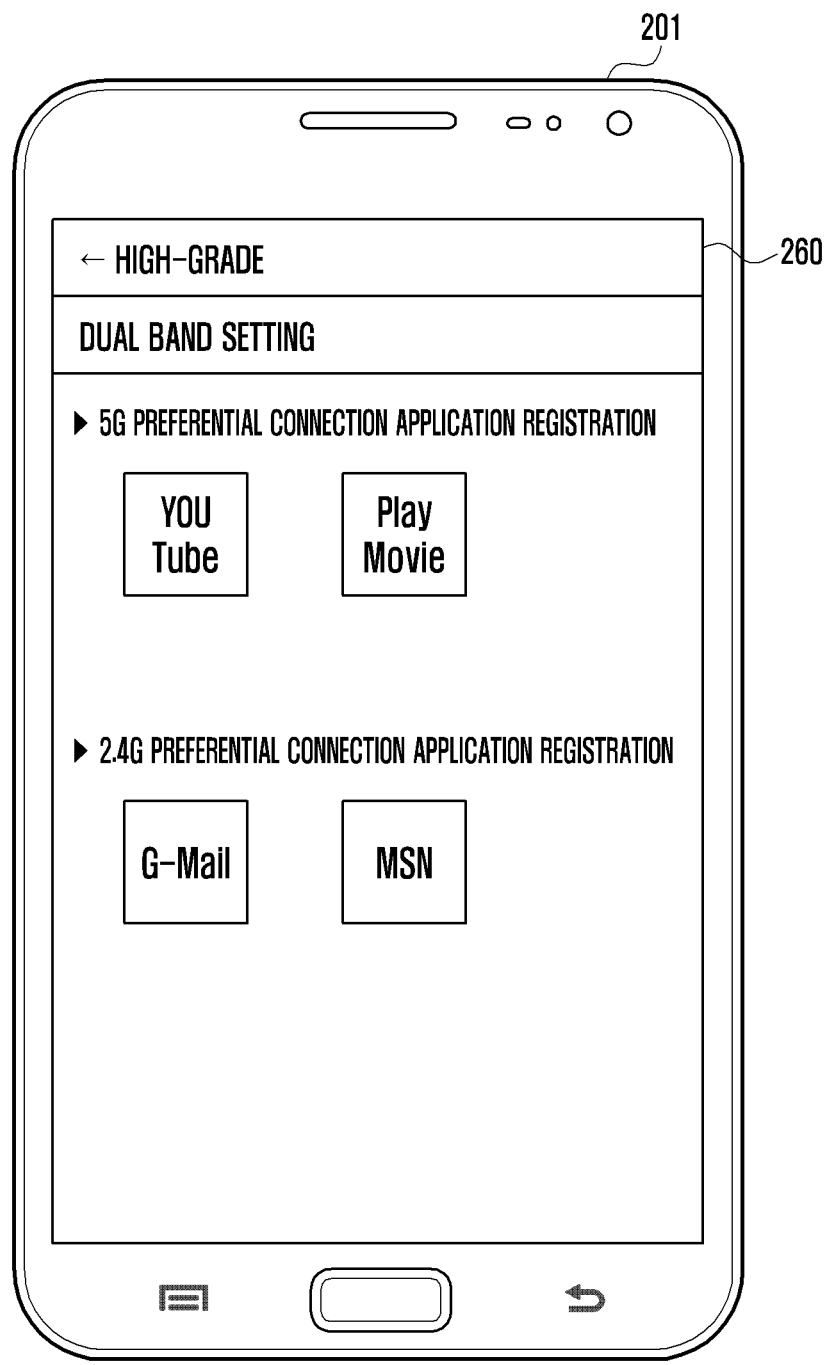
FIG. 11 is a diagram illustrating operation of an electronic device according to an embodiment of the present disclosure that receives an input for designating one of a first band and a second band to be used for the function from a user.

FIG. 11 is a diagram illustrating operation of an electronic device according to an embodiment of the present disclosure that receives an input for designating one of a first band and a second band to be used for the function from a user.

Referring to FIG. 11 the electronic device 201 may pre-designate whether the function is performed through the first band or the second band. The electronic device 201 may include the input device 250 that receives an input for designating one of the first band and the second band to be used for the function. The electronic device 201 may receive settings, in which a specific function is performed through a specific band, from a user through the input device 250. For example, referring to FIG. 10, the electronic device 201 may receive an input, from a user, that is preset to run a real-time streaming application through 5 GHz band, and may receive an input that is preset to run an application for transmitting and receiving messages through 2.4 GHz band from the user.

The term "module", as used herein, may refer to a unit that includes one of hardware, software and firmware or any combination thereof. The term "module" may be interchangeably used with, for example, "unit", "logic", "logical block", "component", or "circuit". A module may be a minimum unit, or a part thereof, that performs one or more particular functions. The module may be formed mechanically or electronically. For example, the module disclosed herein may include at least one of an application-specific integrated circuit (ASIC) chip, field-programmable gate arrays (FPGAs), and programmable-logic device, which have been known or are to be developed.

Embodiments of the present disclosure described in the specification and the drawings are only particular examples to easily describe the details of the present disclosure and assist in understanding of the present disclosure, and do not limit the scope of the present disclosure. It will be apparent to those having ordinary knowledge in the technical field, to which the present disclosure pertains, that it is possible to practice other modified embodiments based on the technical idea of the present disclosure as well as the embodiments disclosed herein.

Although embodiments of the present disclosure have been shown and described in this specification and the drawings, they are used in general sense in order to easily explain technical contents of the present disclosure, and to help comprehension of the present disclosure, and are not intended to limit the scope of the present disclosure. It is obvious to those skilled in the art to which the present disclosure pertains that other modified embodiments on the basis of the spirits of the present disclosure besides the embodiments disclosed herein can be carried out.

Hereinabove, embodiments of the present disclosure have been described with reference to the accompanying drawings. Specific terms or words used in the description should be construed in accordance with the spirit of the present disclosure without limiting the subject matter thereof. It should be understood that many variations and modifications will still fall within the spirit and scope of the present disclosure as defined in the appended claims and their equivalents.

What is claimed is:

1. An electronic device comprising:
   a wireless communication unit configured to support short-range wireless communication performed through wireless-fidelity (Wi-Fi) with an external device using a first band and a second band;
   a processor electrically connected to the communication unit; and
   a memory electrically connected to the processor,
   wherein the memory is configured to store instructions which, when executed, cause the processor to:
   receive a function performance request for a first function and a second function;
   identify, in response to receiving the function performance request, a characteristic and surrounding network environment information for each of the first function and the second function executed in the electronic device,
   perform the first function by using the first band based on the characteristic and the surrounding network environment information corresponding to the first function, and
   perform the second function by using the second band based on the characteristic and the surrounding network environment information corresponding to the second function,
   wherein the first band includes one of a 2.4 GHz band or a 5 GHz band and the second band includes the other of the 2.4 GHz band or the 5 GHz band different from the first band,
   wherein the surrounding network environment information includes received signal strength indicator (RSSI), modulation and coding scheme (MCS), and a stream value of at least one external device, and
   wherein the instructions cause the processor to identify values of the RSSI, MCS, and stream of the at least one external device.

2. The electronic device of claim 1, wherein the instructions cause the processor to perform the first function through the first band if the function performance request includes the first function, and
   to perform the second function through the second band if the function performance request includes the second function.

3. The electronic device of claim 1, wherein the instructions cause the processor to identify a communication type of the first function or the second function.

4. The electronic device of claim 3, wherein the instructions cause the processor to perform the first function through the first band if a communication type of the first function is a message transmission/reception type, and
   to perform the second function through the second band if the communication type of the second function is a streaming type or a file transmission/reception type.

5. The electronic device of claim 1, wherein the instructions cause the processor to identify a data transfer rate of the first function or the second function.

6. The electronic device of claim 5, wherein the instructions cause the processor to perform the first function through the first band if the data transfer rate is lower than a predetermined value, and
   to perform the second function through the second band if the data transfer rate is equal to or higher than the predetermined value.

7. The electronic device of claim 1, wherein the instructions cause the processor to perform the function through one of the first band and the second band of the external device that is determined to have the highest signal strength on the basis of the result of identifying the at least one value.

8. The electronic device of claim 1, further comprising an input device for receiving an input for designating one of the first band and the second band to be used for the first function or the second function.

9. A method for performing wireless communication of an electronic device that supports short-range wireless communication performed through wireless-fidelity (Wi-Fi) with an external device using a first band and a second band, comprising:
   receiving a function performance request for a first function and a second function;
   identifying, in response to receiving the function performance request, a characteristic and surrounding network environment information for each of the first function and the second function executed in the electronic device;
   performing the first function by using the first band based on the characteristic and the surrounding network environment information corresponding to the first function; and
   performing the second function by using the second band based on the characteristic and the surrounding network environment information corresponding to the second function,
   wherein the first band includes one of a 2.4 GHz band or a 5 GHz band and the second band includes the other of the 2.4 GHz band or the 5 GHz band different from the first band,
   wherein the surrounding network environment information includes received signal strength indicator (RSSI), modulation and coding scheme (MCS), and a stream value of at least one external device, and
   wherein identifying the surrounding network information comprises identifying values of the RSSI, MCS, and stream of the at least one external device.

10. The method of claim 9, wherein the first function is performed through the first band if the function performance request includes the first function, and
    wherein the second function is performed through the second band if the function performance request includes the second function.

11. The method of claim 9, wherein identifying the characteristic comprises identifying a communication type of the first function or the second function.

12. The method of claim 11, wherein the first function is performed through the first band if a communication type of the first function is a message transmission/reception type; and
    wherein the second function through the second band if the communication type of the second function is a streaming type or a file transmission/reception type.

13. The method of claim 9, wherein identifying the characteristic of the function comprises identifying a data transfer rate of the first function or the second function.

14. The method of claim 13, wherein the first function is performed through the first band if the data transfer rate is lower than a predetermined value; and
   wherein the second function is performed through the second band if the data transfer rate is equal to or higher than the predetermined value.

15. The method of claim 9, wherein the first function and the second function are performed through one of the first band and the second band of the external device that is determined to have the highest signal strength on the basis of the result of identifying the at least one value.

16. The method of claim 9, further comprising receiving an input for designating one of the first band and the second band to be used for the first function or the second function.

\* \* \* \* \*